United States Patent

[11] 3,607,008

[72] Inventors Vincent Chiola
Towanda;
Phyllis R. Dodds, Wysox; Tai K. Kim,
Towanda; John A. Powers, New Albany, all
of Pa.
[21] Appl. No. 837,894
[22] Filed June 30, 1969
[45] Patented Sept. 21, 1971
[73] Assignee Sylvania Electric Products Inc.

[54] SEPARATION OF MOLYBDENUM VALUES FROM TUNGSTEN VALUES BY SOLVENT EXTRACTION
10 Claims, No Drawings
[52] U.S. Cl. .................................................. 23/22,
23/51, 23/140, 23/312 ME, 23/23, 23/15 W
[51] Int. Cl. ...................................................... C22b 59/00,
C01g 39/00
[50] Field of Search ........................................... 23/15.5,
18–20, 22–24, 51, 312 ME

[56] References Cited
UNITED STATES PATENTS
3,180,703  4/1965  Ableson et al. .............. 23/312 ME
FOREIGN PATENTS
967,823  8/1964  Great Britain ................ 23/(15.5)
OTHER REFERENCES
Jenkins et al., " Journal of Applied Chemistry," Vol. 14, Oct. 1964, pp. 449–454. 23/15.5

*Primary Examiner*—Herbert T. Carter
*Attorneys*—Norman J. O'Malley, Donald R. Castle and William H. McNeill ABSTRACT: A process for separating molybdate values from tungstate values using solvent extraction is disclosed. The process comprises forming an acidic aqueous feed solution, having a controlled pH, from an impure molybdenum source material containing molybdate and tungstate values by dissolving said source material in an aqueous solution of a mineral acid, contacting said feed solution with a water-insoluble three component organic extractant phase consisting essentially of di-2-ethylhexyl phosphoric acid as an extractant, tributyl phosphate as a solubilizer and a water-insoluble hydrocarbon solvent, the volumetric ratio of the extractant to the solubilizer being from about 5:6 to about 17:1, the volumetric ratio of the extractant to the solvent being from about 1:1 to about 1:8, the volumetric ratio of the solubilizer to the solvent being from about 1:1 to about 1:17 to extract at least a portion of the molybdate values from said feed solution, separating the resultant aqueous molybdenum-barren phase from the resultant organic molybdenum-pregnant phase, contacting the organic molybdenum-pregnant phase with an aqueous strip solution g ammonium ions, separating the resultant molybdenum-pregnant aqueous strip solution from the resultant molybdenum-barren organic solution and recovering the molybdenum-pregnant, tungsten-free aqueous strip solution.

SEPARATION OF MOLYBDENUM VALUES FROM TUNGSTEN VALUES BY SOLVENT EXTRACTION

BACKGROUND OF THE INVENTION

This invention relates to the recovery and purification of molybdenum from an acidic molybdate solution by a liquid-liquid solvent extraction process. More particularly, it relates to the recovery and purification of molybdenum from tungsten-containing molybdenum solutions by a liquid-liquid solvent extraction process wherein molybdenum values are first extracted by an organic mixture and are then recovered as aqueous ammonium molybdate solutions, which are suitable for processing to high-purity ammonium paramolybdate or pure-grade molybdenum trioxide.

Methods for the separation of tungsten and molybdenum are known. In one method, the molybdenum is first reduced with the thioglycolic acid and extracted as molybdenum (V) thiocyanate complex. After reduction with $TiCl_3$, tungsten is extracted as a tungsten (V) thiocyanate complex. A second method uses tartaric acid as a complexing agent to hold tungsten in solution while molybdenum is precipitated as molybdenum sulfide. In a third method of separation, tungsten is extracted as a tungsten (VI) 8-hydroxyquinoline complex while the molybdenum remains in the aqueous phase as nonextractable molybdenum (V) ethylenediamine tetraacetic acid complex after reduction with hydrazine hydrochloride.

The disadvantages of the heretofore known process are believed to be apparent. For example, the above-mentioned systems are not suitable for large-scale production. Additionally, in general, molybdenum compounds that are difficult to process further are produced, and in most instances only dilute feed solutions containing molybdenum or tungsten can be used. Ion-exchange separation of tungsten and molybdenum has also been investigated. In this method molybdenum- and tungsten-containing solutions are transferred to a column containing a cation exchange resin. An eluent that is 4M hydrochloric acid and 0.1M citric acid, is used to remove the tungsten, and an eluent that is 1.9M ammonium chloride and 0.44M ammonium citrate is used to remove the molybdenum. Although this method is reported to be quantitative for the separation of tungsten and molybdenum, several factors prohibit its use in production, namely, (1) only very dilute solutions of tungsten and molybdenum can be processed, and (2) the method is time-consuming and results in equipment tie-up.

In copending patent applications Ser. No. 837,777 and Ser. No. 837,925 filed concurrently herewith, there are disclosed methods for purifying molybdenum from certain impurities. Although the molybdenum is purified with respect to impurities such as Cu, Na, K, Fe, etc. the amine extracts both tungsten and molybdenum and a tungsten-free molybdenum product is not obtainable by those methods if tungsten is present as an impurity. It is believed, therefore, that a highly efficient method to produce a tungsten free ammonium molybdate solution from an acidified molybdate solution containing tungsten would be an advancement in the art.

SUMMARY OF THE INVENTION

In accordance with one aspect of this invention, an acidic aqueous feed solution having a pH of from about 1 to about 3 is prepared by dissolving a molybdenum source material containing tungsten in an aqueous solution of mineral acid, contacting said aqueous feed solution for a specific time with an organic solution containing di-2-ethylhexyl phosphoric acid (D2EHPA), tri-n-butyl phosphate (TBP) and a water-insoluble hydrocarbon solvent, where D2EHPA is the extractant, TBP acts as a solubilizer or modifier, and the hydrocarbon is the diluent or solvent, to extract molybdenum into the organic phase, seperating the resultant molybdenum-laden organic solution and the molybdenum-barren aqueous phase, contacting the molybdenum-loaded organic phase with a solution containing a source of ammonium ions to regenerate the organic phase for recycling, and to produce molybdenum in soluble form suitable for further processing.

DESCRIPTION OF THE PREFERRED EMBODIMENTS

Any mineral acid can be used to acidify the aqueous feed solution. Sulfuric acid is generally preferred because of its ease of handling, reaction and cost. For example, it is possible to extract molybdenum from acidified molybdate-containing solutions having concentrations as high as 130g./l., ($MoO_3$ basis) with greater than 99percent efficiency in 4 stages using a 5:1organic to aqueous feed solution volumetric ratio.

As previously mentioned, the molybdenum source material contaminated with tungsten, is dissolved in an aqueous solution of a mineral acid. The pH is held at from about 1to about 3.0.A higher pH can result in the formation of extractable tungstate species and unextractable molybdenum species. A lower pH, that is below about 1, can result in degradation of some of the components of the organic extractant solution and the formation of unextractable molybdenum species. Additionally, lower pH ranges do not advantageously effect the process of this invention and the use of the excess acid merely adds unnecessary costs to the process, therefore, a pH of about 2 is preferred.

In a typical process the molybdenum source material will be molybdate solution produced as a result of a caustic digestion of an impure molybdenum source such as impure $MoO_3$ or molybdenum-containing ores preferably using sodium hydroxide as the caustic. As can be appreciated, these materials can contain tungsten or the corresponding tungstate. Potassium hydroxide can also be used as the caustic source, however sodium hydroxide is preferred. The process of this invention is independent of the cation portion of the molybdate and tungstate radicals.

The feed solutions can be relatively concentrated, therefore, feed solutions containing as much as 130 g./liter $MoO_3$ basis can be recovered at greater than 99 percent efficiency. Heretofore, only relatively dilute solutions containing less than about 10 g./liter could be processed by the process known in the prior art.

The organic extractant solution contains di-2-ethylhexyl phosphoric acid, as an extractant, tributyl phosphate as a solubilizer or modifier, and a hydrocarbon solvent as a solvent or diluent.

Although any water-insoluble hydrocarbon solvent, such as the petroleum distillate solvents, such as kerosene, naptha, benzene, toluene and the like can be used as the diluent or solvent, kerosene is preferred because of its cost, flash point, and toxicity rating. As used herein, water-insoluble means that less than about 5 grams of the hydrocarbon will dissolve in 100 cc. of water at 20° C. These components can be used in various volumetric ratios within specified ranges. The volumetric ratio of extractant to solubilizer can be varied from about 5:6 to about 17:1, the volumetric ratio of extractant to solvent can be varied from about 1:1 to about 1:8 and the volumetric ratio of solubilizer to solvent can be varied from about 1:1 to about 1:17 thus giving the following ranges in the three component system, on a basis of 100, from 1012:78 to 48.5:3:48.5 to 33.3:33.3:33.3. The foregoing ratios are given in terms of extractant:solubilizer:solvent respectively.

The extraction of molybdenum from the feed solution into the organic phase occurs rapidly and at least some molybdenum is extracted almost instantaneously, however, for practical design reasons, it is preferred to use longer times so that the systems approach equilibrium. It has been found that from about 20 to 30 minutes of contact time between the organic extractant phase and the aqueous feed solution is preferred. Shorter periods of contact lower the efficiency and more stages are needed to achieve high efficiencies. Longer periods of contact do not improve the efficiency, therefore lower the throughout of the system. The above contact times are based upon using conventional means of agitation that are generally used in chemical processes where liquid-liquid contact is desired.

The temperature during the extraction step can be varied up to about 45° C. Higher temperatures can result in degradation of the extractant solution. Temperatures of from about 20° C. to about 40° C. are preferred.

The volumetric ratio of extractant to the feed solution can be varied over a wide range and achieve at least some of the benefits of this invention. As for example, the volumetric ratio of organic extractant to aqueous feed solution can be varied from about 100:1 to about 1:100 and at least some molybdenum will be extracted. In the instances where maximum concentration of molybdenum in the aqueous feed solution is desired, about a 4:1 to 6:1 organic extraction phase to the acidic aqueous feed solution volumetric ratio is preferred. Deviations from the preferred ratio can be tolerated but with a corresponding loss in efficiency as is apparent from the detailed examples presented herein.

In the stripping step the molybdenum-pregnant organic solution is contacted with an aqueous strip solution containing ammonium ions to recover the molybdenum extracted. Efficient aqueous solutions contain a source of ammonium ions such as aqueous solutions of ammonium molybdate, ammonium hydroxide, ammonium chloride and the like. In general, any water-soluble ammonium compound, as well as ammonia, can be used to derive the ammonium ion source, however, a mixture of ammonium molybdate and ammonium hydroxide is preferred because of the efficiency, the number of stages required to achieve high recovery and the generation of a strip solution that can be converted directly into a useable product, ammonium molybdate.

The period of time required to remove the molybdenum from the organic phase is generally about the same as for the removal of molybdenum from the feed solution by the organic. Deviation from the preferred time results in either lower efficiency or decreased throughput as in the extraction step.

The volumetric ratio of strip solution to the molybdenum-pregnant organic phase can be varied from about 1:100 to about 100:1. A volumetric ratio of about 1:4 to about 4:1 is preferred from an efficiency and design standpoint.

To more fully illustrate this invention, the following detailed examples are presented. All parts, proportions, ratios and percentages are on a volumetric basis unless otherwise stated.

EXAMPLE I

Solutions of sodium molybdate are acidified to a pH of about 2 with $H_2SO_4$, and contacted with solutions of D2EHPA-TBP-kerosene varying in concentration of D2EHPA from 50 percent to 5 percent volumetric basis. Aliquots of aqueous and organic phases are taken and Kd's (distribution coefficient o/a) obtained. Results of these date are summarized:

| Sample | Aq. Soln. | Organic Soln | Kd |
|---|---|---|---|
| 1 | $Na_2MoO_4$ | 50% EHPA 10% TBP 40% kerosene | 52.4 |
| 2 | $Na_2MoO_4$ | 35% D2EHPA 10% TBP 55% kerosene | 53.3 |
| 3 | $Na_2MoO_4$ | 20% D2EHPA 10% TBP 70% kerosene | 74.6 |
| 4 | $Na_2MoO_4$ | 10% D2EHPA 10% TBP 80% kerosene | 42.1 |
| 5 | $Na_2MoO_4$ | 5% D2EHPA 5% TBP 90% kerosene | 33.9 |

EXAMPLE II

A $Na_2MoO_4$ solution is doped with $^{99}Mo$, acidified to a pH of about 2 with $H_2SO_4$ and samples are contacted with equal volumes of an extractant solution having ratios of 23-6-71 D2EHPA-TBP-kerosene. The samples are shaken for different periods of from 1 to 60 minutes. Aliquots of both phases in all samples are counted, Kd's obtained, and optimum contact time is determined from the following data:

| Sample | Contact Time | Kd |
|---|---|---|
| 1 | 1 min. | 1.57 |
| 2 | 5 | 1.43 |
| 3 | 10 | 1.46 |
| 4 | 15 | 1.56 |
| 5 | 20 | 1.61 |
| 6 | 25 | 1.9 |
| 7 | 30 | 1.8 |
| 8 | 40 | |
| 9 | 50 | 2.1 |
| 10 | 60 | 1.9 |

After about 25 minutes the Kd values level off and longer contact times are unnecessary.

EXAMPLE III

Various concentrations of $Na_2MoO_4$ solutions are prepared, doped with $^{99}Mo$, acidified to a pH of about 2 with $H_2SO_4$, and contacted with various phase ratios of organic extractant (23 percent D2EHPA-10 percent TBP-71 percent kerosene). Aliquots of both phases in all samples are counted and Kd's are obtained. Results appear below.

| Sample | Aq. Conc. | Phase Ratio | Kd | %Ex |
|---|---|---|---|---|
| 1 | 69 g./l. $MoO_3$ | 2:1 | 2.18 | 88.8 |
| 2 | 69 g./l. $MoO_3$ | 3:1 | 1.37 | 80.5 |
| 3 | 69 g./l. $MoO_3$ | 4:1 | 6.88 | 96.4 |
| 4 | 80 g./l. $MoO_3$ | 3:1 | 0.88 | 72.7 |
| 5 | 80 g./l. $MoO_3$ | 4:1 | 2.48 | 90.8 |
| 6 | 80 g./l. $MoO_3$ | 5:1 | 6.51 | 97.0 |
| 7 | 100 g./l. $MoO_3$ | 3:1 | 0.06 | 15.3 |
| 8 | 100 g./l. $MoO_3$ | 4:1 | 3.57 | 93.3 |
| 9 | 100 g./l. $MoO_3$ | 5:1 | 3.44 | 94.5 |
| 10 | 130 g./l. $MoO_3$ | 4:1 | 1.44 | 85.2 |
| 11 | 130 g./l. $MoO_3$ | 5:1 | 1.99 | 90.8 |
| 12 | 130 g./l. $MoO_3$ | 6:1 | 0.41 | 80.4 |

At a 5:1 ratio organic to aqueous ratio, a concentration of 130 g./l. $MoO_2$ in the feed solution can be used. This relatively high concentration enables an economic production rate.

EXAMPLE IV

Molybdenum-loaded organic is contacted with various stripping solutions. Aliquots of both phases in all samples are analyzed and stripping factors and percent stripping obtained from the results.

| Sample | Stripping Agent | Separation Factor | % Separation |
|---|---|---|---|
| 1 | 0.7M $(NH_4)_2MoO_4$ | 2.01 | 66.7 |
| 2 | 1.0M $(NH_4)_2MoO_4$ | 40.68 | 97.6 |
| 3 | 1.5M $(NH_4)_2MoO_4$ | 42.48 | 97.7 |
| 4 | 2.0M $(NH_4)_2MoO_4$ | 34.24 | 97.1 |
| 5 | 0.5M $(NH_4)_2MoO_4$ + 0.5M $NH_4OH$ | 68.78 | 98.5 |
| 6 | 1.0M $(NH_4)_2MoO_4$ + 0.5M $NH_4OH$ | 38.85 | 89.9 |
| 7 | 1.0M $(NH_4)_2MoO_4$ + 1.0M $NH_4OH$ | 46.61 | 97.89 |

In two stages the 0.5M $(NH_4)_2MoO_4$ + 0.5M $NH_4OH$ solution strips greater than about 99.9 percent of the molybdenum in the organic phase.

EXAMPLE V

Molybdenum-loaded organic is contacted with 0.5M $NH_4OH$ and 0.5M $(NH_4)_2MoO_4$ for times ranging from 1 to 60 minutes. Aliquots of both phases in all samples are analyzed and stripping coefficients are obtained. The results appear on the following page

| Sample | Contact Time | Stripping Coefficient |
|---|---|---|
| 1 | 1 min. | 3.31 |
| 2 | 5 | 84.60 |
| 3 | 10 | 85.08 |

Table – Continued

| 4 | 15 | 77.21 |
|---|----|-------|
| 5 | 20 | 92.37 |
| 6 | 25 | 104.52 |
| 7 | 30 | 100.57 |
| 8 | 40 | 93.22 |
| 9 | 50 | 99.43 |
| 10 | 60 | |

The above results indicate that some molybdenum is stripped even at one minute contact time with about 25 to about 30 minutes being optimum.

EXAMPLE VI

An aqueous feed containing 130 g./liter of $MoO_3$ is tagged with $^{181}W$ and adjusted to various pH's before it is contacted with 23 percent D2EHPA-6 percent TBP-71 percent kerosene for 25 minutes. Aliquots of both phases from all samples are taken and analyzed and results appear below.

| Sample | pH Aq. Soln. | Kd for W |
|--------|--------------|----------|
| 1 | 1.0 | 0.012 |
| 2 | 1.5 | 0.03 |
| 3 | 2.0 | 0.004 |
| 4 | 2.5 | 0.048 |
| 5 | 3.0 | 0.049 |
| 6 | 3.5 | 0.055 |

The results clearly indicate that a pH of at least 2 is preferred in order to maximize the separation of tungsten and molybdenum.

EXAMPLE VII

An organic solution composed of a ratio 1:1:1 (by volume) D2EPHA-TBP-kerosene is prepared. The aqueous solutions are made by dissolving reagent-grade sodium molybdate in deionized water to give $MoO_3$ concentrations of 0.5, 1, 5, 10, 25 and 50 gms./l. The pH of the aqueous solutions is adjusted to about 2 using sulfuric acid. The same procedure is followed except that organic composition is 23:6:71 (by volume) D2EPHA TBP and kerosene. Equal volumes of the organic and aqueous solutions are mixed for about 22 inches. When separation is complete a sample of the aqueous solution is analyzed for grams Mo/liter. From this data, the Mo concentration in the organic is determined by difference. The results appear below.

| Feed Solution Molybdenum Concentration, (grams/liter) | Percentage Molybdenum in Organic Phase Organic Solution (ratio) | |
|---|---|---|
| | 1:1:1 | 23:6:71 |
| 0.5 | <99 | <99 |
| 1 | <99 | <99 |
| 5 | <99 | <99 |
| 10 | <99 | <99 |
| 25 | <99 | 86 |
| 50 | 72 | 36 |

The above data indicates that at the 1:1 organic to aqueous ratio more than one stage is required in order to achieve high efficiency when the feed solution becomes more concentrated.

EXAMPLE VIII

The same procedure is followed as in example VII except pH of aqueous solution is adjusted to about 2 using HCl and a 1:1:1 ratio in the organic phase is used. Results appear below.

| Feed Solution Molybdenum Concentration, (grams/liter) | Percentage of Molybdenum in Organic Phase |
|---|---|
| 0.5 | <99 |
| 1 | <99 |
| 5 | <99 |
| 10 | <99 |
| 25 | 92 |
| 50 | 62 |

The above results indicate that HCl can be used in place of sulfuric acid.

While there has been shown and described what is at present considered the preferred embodiments of the invention, it will be obvious to those skilled in the art that various changes and modifications may be made therein without departing from the scope of the invention as defined by the appended claims.

We claim:

1. A process for separating molybdate values for tungstate values comprising:
   a. forming an acidic aqueous feed solution having a pH from about 1 to about 3 by dissolving an impure molybdenum source containing molybdenum and tungsten values in an aqueous solution of a mineral acid;
   b. contacting said feed solution with a water-insoluble organic extractant solution consisting essentially of a di-2-ethyl-hexyl phosphoric acid as an extractant, tributyl phosphate as a solubilizer and a water-insoluble hydrocarbon solvent, the volumetric ratio of the extractant to the solubilizer being from about 5:6 to about 17:1, the volumetric ratio of extractant to solvent being from about 1:1 to about 1:8 and the volumetric ratio of solubilizer to solvent being from about 1:1 to about 1:17 under temperature conditions not exceeding 45° C., to extract at least a portion of the molybdenum from the feed solution;
   c. separating the resultant molybdenum-pregnant organic phase from the resultant molybdenum-barren aqueous phase;
   d. contacting said molybdenum-pregnant organic phase with an aqueous strip solution containing ammonium ions to remove at least a portion of the molybdenum-laden aqueous strip solution from the resultant molybdenum-barren organic solution, and
   f. recovering the molybdenum-pregnant, tungsten-free strip solution.

2. A process according to claim 1 wherein the pH of said acidic aqueous feed solution is about 2.

3. A process according to claim 2 wherein the volumetric ratio of the organic extractant phase to said acidic aqueous feed solution is from about 4:1 to about 6:1.

4. A process according to claim 3 wherein said hydrocarbon is kerosene.

5. A process according to claim 4 wherein said strip solution is an aqueous solution of ammonium molybdate and ammonium hydroxide.

6. A process according to claim 5 wherein the volumetric ratio of said strip solution to said organic phase is about 1.1.

7. A process according to claim 6 wherein said molybdenum-barren organic solution is recycled.

8. A process according to claim 2 wherein said process is a batch process.

9. A process according to claim 2 wherein the organic extractant is recycled for use.

10. A process according to claim 9 wherein said process is a continuous process.

PO-1050
(5/69)

UNITED STATES PATENT OFFICE
CERTIFICATE OF CORRECTION

Patent No. 3,607,008   Dated September 21, 1971

Inventor(s) Vincent Chiola, Phyllis R. Dodds, Tai K. Kim and John A. Powers

It is certified that error appears in the above-identified patent and that said Letters Patent are hereby corrected as shown below:

```
Abstract - Line 20 - "g" should read "containing".
Col. 2, line     68 - "throughout" should read "throughput"
Col. 4, line     23 - "6.88 96.4" should be in two separate
                      columns.
Col. 5. line     45 - "inches" should read "minutes"
Col. 6, Claim 1 line 24 - "for" second instance should
                      read "from"
Col. 6, Claim 1 line 49 et seq. - d. and e. mixed up -
                      should read
``` d. contacting said molybdenum-pregnant organic phase with an aqueous strip solution containing ammonium ions to remove at least a portion of the molybdenum from the organic phase, e. separating the resultant molybdenum-laden aqueous strip solution from the resultant molybdenum-barren organic solution, and Signed and sealed this 11th day of April 1972.

(SEAL)
Attest:

EDWARD M. FLETCHER, JR.
Attesting Officer

ROBERT GOTTSCHALK
Commissioner of Patents